March 19, 1957  J. R. FURRER  2,785,640
REVERSIBLE SUSPENSION FOR RAILWAL CARS
Filed Oct. 19, 1951  3 Sheets-Sheet 1
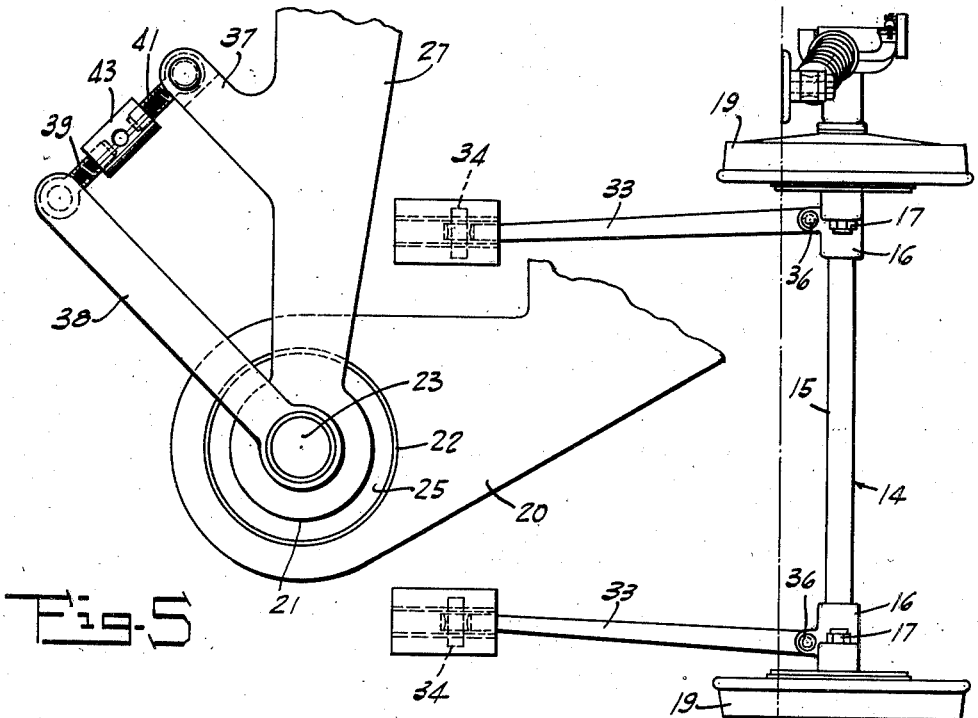
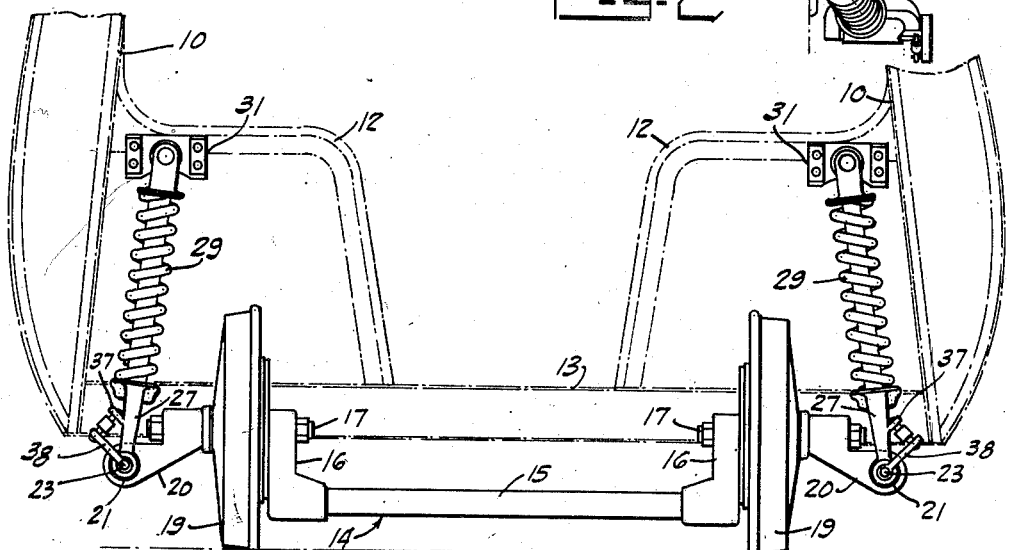
INVENTOR
JOHN R. FURRER
BY
*George R. Ericson*
ATTORNEY March 19, 1957    J. R. FURRER    2,785,640
REVERSIBLE SUSPENSION FOR RAILWAL CARS
Filed Oct. 19, 1951    3 Sheets-Sheet 2

INVENTOR
JOHN R. FURRER
BY
George R. Ericson
ATTORNEY

March 19, 1957   J. R. FURRER   2,785,640
REVERSIBLE SUSPENSION FOR RAILWAL CARS
Filed Oct. 19, 1951   3 Sheets-Sheet 3
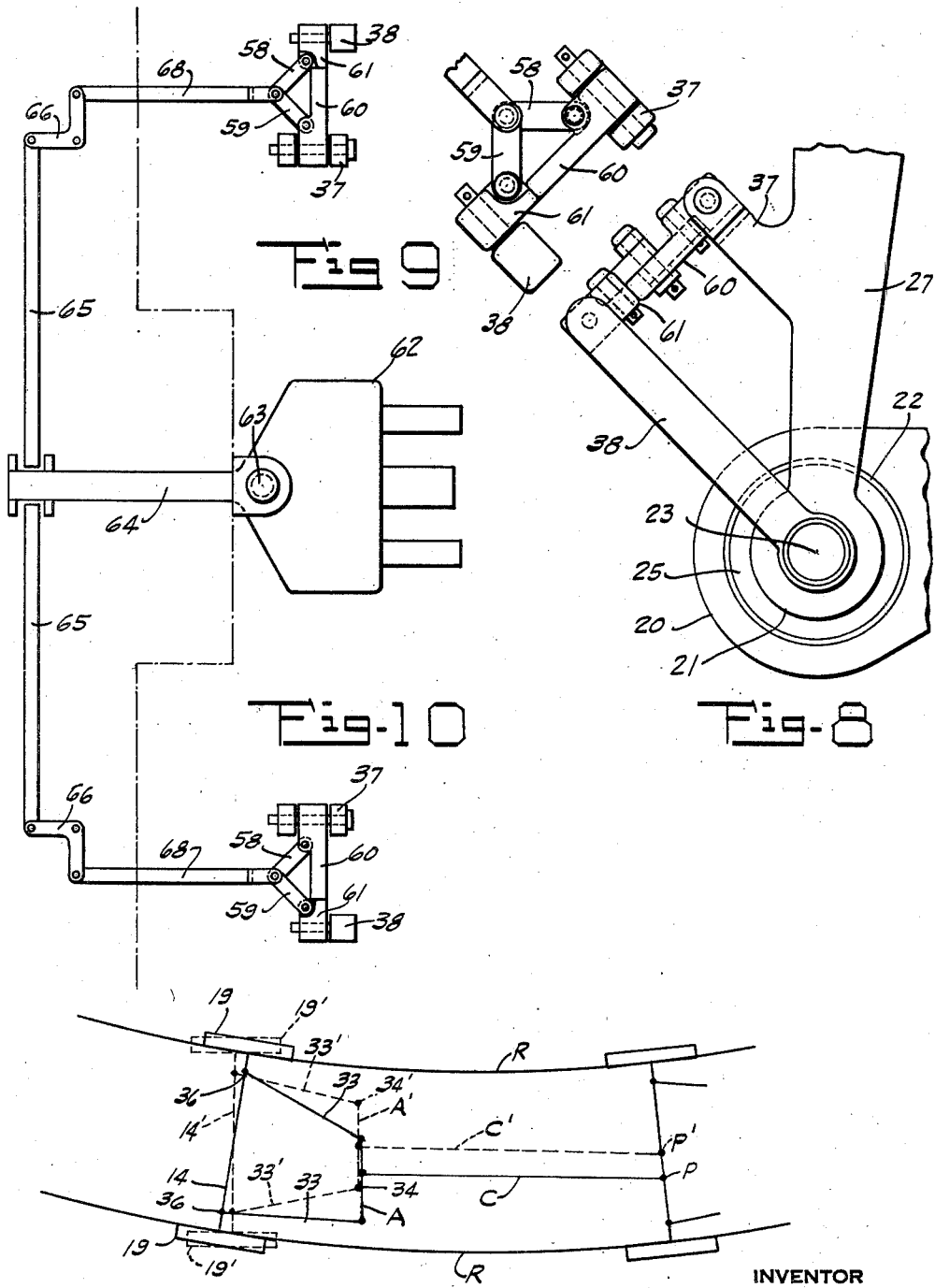
INVENTOR
JOHN R. FURRER
BY
George R. Ericson
ATTORNEY

United States Patent Office 2,785,640
Patented Mar. 19, 1957

2,785,640

REVERSIBLE SUSPENSION FOR RAILWAY CARS

John R. Furrer, Milwaukee, Wis., assignor to ACF Industries, Incorporated, a corporation of New Jersey Application October 19, 1951, Serial No. 252,112

9 Claims. (Cl. 105—4)

This invention relates to suspensions for railway cars composed of a plurality of coupled articulated two-wheeled trailer units, and consists particularly in suspension arrangements whereby such articulated cars may be safely operated at high speeds in either direction.

In cars of this type heretofore constructed it has been the practice to secure the axle structure to the body framing normal to the longitudinal axis of the body, supporting the unwheeled front end of one trailer unit on the wheeled rear end of the adjacent trailer unit. This resulted in the car wheels always being directed toward the inner rail on curves, and although this was desirable in that it eliminated the tendency of the wheels to climb the outer rail, it was disadvantageous in that if the train were reversed, the wheels would attack the rails at a positive angle, thereby tending to climb the outer rail of curves. Consequently, cars of this type have not been reversible.

It is therefore an object of this invention to provide a reversible articulated railway car consisting of a plurality of coupled two-wheeled units.

It is a further object to provide suspension means for automatically directing the wheels of such cars so that the vertical plane through the flange will be at all times substantially tangential to the track rails, whereby the cars may operate safely in either direction on curved track.

These and other objects of the invention will be apparent to those skilled in the art from a study of the following description and accompanying drawings, in which:

Fig. 1 is an end view of the wheel, axle, and reversible suspension arrangement of a two wheeled trailer unit.

Fig. 2 is a plan view of the wheel, axle, and suspension shown in Fig. 1.

Fig. 4 is a diagrammatic view showing the function of the reversible suspension arrangement on curved track.

Fig. 5 shows a manual means for pre-setting tension on the lateral stabilizers which form part of the reversible suspension arrangement.

Figs. 8 and 9 show toggle means for varying tension on the lateral stabilizers.

Fig. 10 is a schematic plan view of linkage means for controlling the toggle means shown in Figs. 8 and 9 responsive to movement of the coupler.

Figure 11:
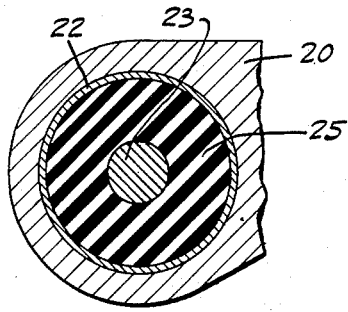
Fig. 11 is a fragmentary sectional view along the line 11—11 of Fig. 3.

Referring now to the drawings, the numeral 10 refers to the end framing of an articulated trailer unit substantially as described in copending application Serial No. 53,176, now Letters Patent No. 2,697,990, filed October 7, 1948, including wheel housing frames 12, and an underframe 13. A drop axle structure 14 consists of transverse member 15, upstanding arms 16 rigidly secured to either end of member 15 and stub axles 17 carried by the upper ends of the arms. Flanged track wheels 19 are rotatably mounted on the stub axles. Outwardly extending brackets 20 are secured to the outer ends of the stub axles and provide a rigid mounting for lateral stabilizers 21, best shown in Fig. 11, which consist of a cylindrical outer shell 22, a central shaft 23, and a rubber mass 25 filling the annular space between shaft 23 and shell 22, rubber mass 25 being bonded to both the central shaft and outer shell to yieldably resist torsional movement of one with respect to the other. Shells 22 are rigidly secured to axle brackets 20. The function and operation of stabilizer 21 will be described in detail below.

Yokes 27 of resilient strut members 29 are pivotally journalled on the ends of shafts 23 and the upper ends of strut members 29 are pivotally journalled on brackets 31 which are rigidly secured to the body framing 12, the distance between the upper pivots of strut members 21 being substantially less than the distance between the lower pivots, so that strut members 29 both slant inwardly thereby exerting a banking effect on the body when rounding curves.

In order to achieve reversibility in cars of this type, it is necessary to vary the angle which the axle structure makes with the longitudinal axis of the car. This is accomplished by the novel arrangement shown in Fig. 2, in which it will be noted that axle 14, radius rods 33 and the transverse axis of the body pivots 34 of the radius rods form a trapezoid as seen in Fig. 2. Radius rods 33 are secured to the underframe 13 by the pivots 34 and to the axle 14 by pivots 36 so as to permit limited rotation in both the vertical and horizontal planes through the pivot points. Fig. 4 shows diagrammatically the effect of this trapezoidal arrangement of the radius rods on a car rounding a curve. In Fig. 4, the letter R refers to the track rails on a curved section. The letter C refers to the longitudinal center line of a two-wheeled trailer unit pivotally secured at one end at point P to the end of an adjacent trailer unit. Dotted lines C', A', 33', 14' and 19' indicate the relative positions respectively of the longitudinal center line, the body pivotal axis of the radius rods, the radius rods, the axle, and the wheels, as these elements would appear on tangent track. When rounding a curve, centrifugal force urges the free end of the longitudinal axis C' outwardly to the position shown by the solid line C; this in turn moves axis A' to the position shown by solid line A. Since the position of the axle pivots of radius rods 33 are unable to move outwardly with respect to the track rails, as would the body pivots 34, the trapezoid shown in dotted lines is transformed into the irregular quadrilateral shown in solid lines. Thus, the axle is swung to the position shown in solid lines at 14 and the wheels to the position shown in solid lines at 19. By varying the displacement of the car body due to centrifugal action, that is the distance between C and C' in proportion to the radius of curvature of the track, wheels 19 may be maintained substantially tangential to the rails at all times.

In order to vary the magnitude of the displacement of the longitudinal center line of the car, I provide means for adjusting the torsion on rubber masses 25 of lateral stabilizers 21 between the axle structures and strut members 29. Strut yokes 27 are provided with a bifurcated bracket 37, and central shaft 23 of the stabilizers is provided with a rigid radial arm 38, to which is pivotally secured a bolt 39. A similar bolt 41 is pivotally secured to the bifurcated end of bracket 37 and bolts 39 and 41 are joined by a turnbuckle 43 whereby the distance between brackets 37 and arms 38 may be lengthened or shortened so as to wind or unwind, respectively, stabilizers 21. Stabilizers 21 are initially wound so that central shaft 23 constantly urges arm 38 toward bracket 37, thereby providing constant tension between the axle brackets and the struts. Increasing the tension on one of the stabilizers tends to decrease the angle between strut 29 and axle bracket 20 thereby tending to limit the car body's outward movement on the side of the tensed stabilizers. By providing equal tension on each of the stabilizers, the car body may be resiliently centered with respect to the axle structure. By increasing tension on the stabilizers, it is obvious that the tendency of the center line of the car to move outwardly due to centrifugal forces when rounding curves may be varied. Thus, by utilizing the turnbuckle arrangement of Fig. 5 to manually vary the tension in the stabilizers 21, the angularity of the wheels with respect to the rails when rounding curves may be similarly varied. The setting of turnbuckles 43 is principally dependent on two factors: anticipated speed of the train and curvature of the route to be traversed by the train.

As a result of the tendency of the car body to be displaced outwardly on curves a distance inversely proportional to the radius of curvature, I provide means for varying the tension on the lateral stabilizers 21 in proportion to the radius of curvature whereby the permitted displacement may be reduced or increased as the radius of curvature varies.

Figure 7:
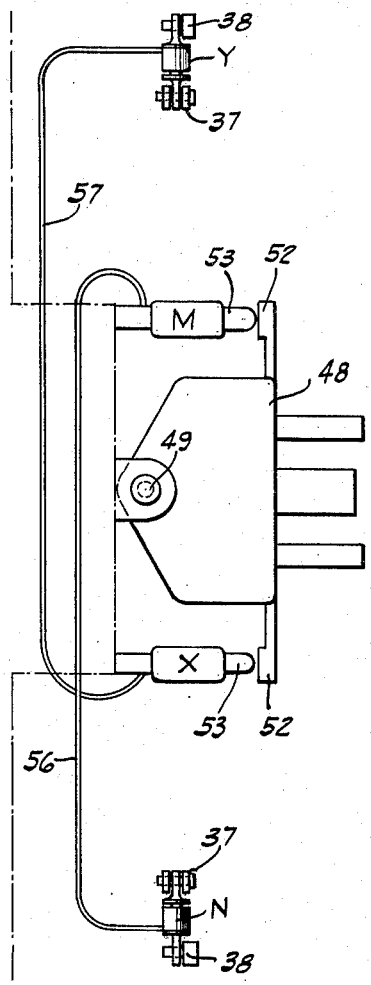
Fig. 7 is a schematic plan view of means for controlling the hydraulic means shown in Fig. 6 responsive to movements of the coupler.
Figure 6:
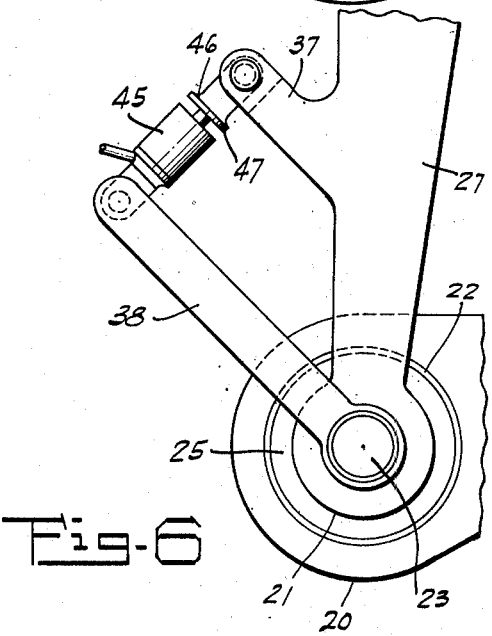
Fig. 6 shows hydraulic means for varying tension on the lateral stabilizers.

A second form of my invention is shown in Fig. 6 in which a hydraulic cylinder 45 and cooperating plunger 46 having a shoulder 47 are substituted for the turnbuckle arrangement of Fig. 5, and are pivotally connected respectively to bracket 37 and arm 38 for varying the tension in stabilizers 21. Stabilizers 21 are initially wound up so as to at all times exert a stabilizing influence on the body and also to urge cylinder 45 and shoulder 46 into abutting relation. Referring to Fig. 7, the numeral 48 indicates a male coupler member substantially as disclosed in my copending application Serial No. 270,632, filed February 8, 1952, now Patent No. 2,743,943, pivotally secured to the car underframe at 49. Coupler 48 is provided with a pair of laterally projecting members 52 adapted to engage plungers 53 of hydraulic master cylinders M and X. A hydraulic line 56 connects master cylinder M with servo-cylinder N so that as the car rounds a curve and coupler 48 is rotated counter-clockwise, lateral extension 52 will push plunger 53 of master cylinder M inwardly thereby forcing fluid through hydraulic line 56 and into servo-cylinder N. Since the amount of rotation of coupler 48 is dependent upon the radius of curvature, it will be seen that the operation described above will increase the tension on the stabilizer on the outside of the curve, without affecting the tension on the inside stabilizer, thus limiting outward displacement of the body to the displacement required to provide the necessary angularity of the axle 14. The master cylinder X is similarly connected to servo-cylinder Y by a hydraulic line 57, and functions similarly when coupler 48 is rotated clockwise in rounding a curve. By merely interchanging the connections between cylinders M and N, and X and Y, so that master cylinder M is connected with servo-cylinder Y and master cylinder X is connected with servo-cylinder N, the system can easily be modified to permit increased, rather than limited, body displacement, if required to provide the desired axle angularity.

A third form of my invention is shown in Figs. 8, 9 and 10 in which a toggle mechanism, consisting of pivoted links 58 and 59 and stop members 60 and 61, is substituted for the turnbuckle arrangement of Fig. 5 for the purpose of varying the distance between bracket 37 and arm 38 whereby tension on the stabilizers may likewise be varied. Stop members 60 and 61 are pivotally mounted on bracket 37 and arm 38, respectively, and provide a pivotal mounting for toggle links 58 and 59. Stabilizers 21 are initially wound to predetermined tension whereby shaft 23 and arm 38 are urged clockwise so that stops 60 and 61 are normally engaged.

Fig. 9 is a schematic view of an operating connection between toggles 58, 59 and a pivoted coupler element 62. Coupler element 62 is similar to the coupler described in my copending application Serial No. 270,632, filed February 8, 1952, and is pivotally secured to the end of the car at 63. The coupler element is formed with an inward longitudinal extension 64 which is adapted to engage push rods 65 when moved from the straight line position shown in Fig. 9. Push rods 65, in turn are pivotally secured to an end of bell cranks 66, the other end of bell cranks 66 being pivotally secured to links 68 which in turn are pivotally secured to the pivotal connection between toggle links 58 and 59. It is evident from Fig. 9, that when coupler 62 is rotated counterclockwise, extension 63 will engage the lower push rod 65 causing lower bell crank 66 to rotate counter-clockwise, which in turn will push lower link 68 to the right thereby moving toggle links 58 and 59 toward straight line position, thus additionally tensing stabilizer 21, which is adjacent the outside of the curve and limiting outward movement of the car body. Movement of coupler 62 clockwise as shown on the drawing will similarly affect upper toggle links 58 and 59 thus additionally tensing the opposite stabilizer 21. Since the amount of rotation of coupler 62 is dependent upon the radius of curvature, and the direction of rotation is dependent upon the direction of curvature, it will be seen that the operation of the device in Figs. 8 and 9 will increase the tension on the stabilizer on the outside of the curve without affecting the tension on the inside stabilizer, thus limiting outward swinging of the body to the displacement required to provide the necessary angularity of axle 14 with respect to the body.

By merely changing rods 65 from push rods to pull rods, the linkage of Fig. 10 may be made to operate so that movement of the coupler elongates the toggle controlling the stabilizer on the inside of the curve, thereby permitting increased, rather than limited, lateral displacement of the body when rounding curves, if increased displacement is required to produce the necessary axle angularity.

Figure 3:
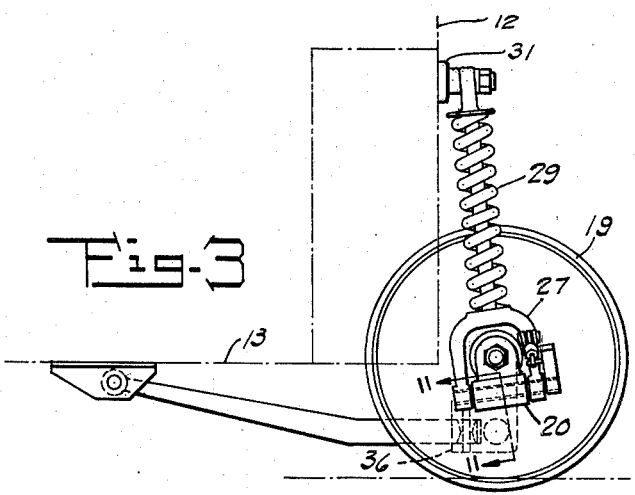
Fig. 3 is a side elevation of the wheel, axle, and suspension arrangement shown in Figs. 1 and 2.

Referring to Fig. 3, it will be noted that struts 29 are slightly inclined longitudinally of the car, the direction of inclination being toward the end of the trailer unit which it supports, thus providing a positive caster. This inclination is desirable as it eliminates the tendency of a vertical or negative caster to hunt and thus cause the axle structure to swivel with respect to the body when the car is being moved with wheeled ends forward, that is, to the right in Fig. 3.

The invention may be modified in various respects as will occur to those skilled in the art, and the exclusive use of all modifications that come within the scope of the appended claims is contemplated.

What is claimed is:

1. In a railway car having a body, a normally transverse axle structure, track wheels on the axle, a pair of resilient strut means supporting said body on the end portions of said axle structure, a pivotal connection between each of said strut means and said axle structure, a pair of substantially horizontal radius rods pivotally secured at one end to each end portion of said axle structure and at the other end to the lower part of the body, said radius rods converging inwardly from said axle to form with their pivotal axes a trapezoidal figure whereby upon lateral displacement of the car body said axle structure is rotated from its transverse position, and adjustable rotation resistant means associated with the pivotal connection between said struts and said axle for limiting the inclination therebetween and consequently the magnitude of the lateral displacement of the body whereby the angularity of said axle structure and wheels with respect to the body may be regulated so as to constantly direct the vertical planes of said wheels substantially tangentially to the rails.

2. In a railway car having a body, a normally transverse axle structure, track wheels on the axle structure, a pair of resilient strut means supporting said body on the end portions of said axle structure, a pivotal connection between each of said strut means and said axle structure, a pair of substantially horizontal radius rods pivotally secured at one end to each end portion of said axle structure and at the other end to the lower part of the body, said radius rods converging inwardly from said axle structure to form with their pivotal axes a trapezoidal figure whereby upon lateral displacement of the car body said axle structure is rotated from its transverse position, resilient devices associated with the pivotal connection between said struts and said axle structure for limiting lateral displacement of said body, and manually operable means for adjusting the stress in said resilient devices and thus to regulate the magnitude of the lateral body displacement whereby the angularity of said axle structure and wheels may be regulated so as to constantly direct said wheels substantially tangentially to the rails.

3. In a railway train comprising a plurality of coupled cars each having a body, a normally transverse axle structure, track wheels mounted on said axle structure, a pair of resilient means supporting said body on the ends of said axle structure, a pivotal connection between each of said resilient means and said axle structure, a pair of substantially horizontal radius rods pivotally secured at one end to each end portion of said axle structure and at the other end to the lower part of the body, said radius rods converging inwardly from said axle structure to form with their pivotal axes a trapezoidal figure whereby upon lateral displacement of the car body said axle structure is rotated from its transverse position, resilient devices associated with the pivotal connection between said resilient means and said axle structure for limiting lateral displacement of said body, and means responsive to changes in the angularity between the longitudinal axes of adjacent cars for varying the stress in said resilient devices and thus regulating the magnitude of the lateral body displacement whereby the angularity of each said axle structure may be regulated so as to always direct the vertical planes of said wheels substantially tangentially to the rails.

4. In a railway train comprising a plurality of coupled cars each having a body, a normally transverse axle structure, track wheels mounted on said axle structure, a pair of resilient means supporting said body on the end portions of said axle structure, a pair of substantially horizontal radius rods pivotally secured at one end to each end portion of said axle structure and at the other end to the lower part of the body, said radius rods converging inwardly from said axle structure to form with their pivotal axes a trapezoidal figure whereby upon lateral displacement of the car body said axle structure is rotated from its transverse position, resilient devices for limiting lateral displacement of said body, and hydraulic servo means responsive to changes in angularity between the longitudinal axes of adjacent cars for varying the stress in said resilient devices and thus regulate the magnitude of the lateral body displacement whereby the angularity of each said axle structure may be regulated so as to always direct the vertical planes of said wheels substantially tangentially to the rails.

5. In a railway car having a body, a normally transverse axle structure, track wheels, resilient means supporting said body on said axle structure, a pair of substantially horizontal radius rods pivotally secured at one end to each end portion of said axle structure and at the other end to the lower part of the body, said radius rods converging inwardly from said axle structure to form with their pivotal axes a trapezoidal figure whereby upon lateral displacement of the car body said axle structure is rotated from its transverse position, resilient stabilizer devices for limiting lateral displacement of said body, and linkage means including a coupler mounted for pivotal movement with respect to said body and responsive to changes in angularity between the longitudinal axes of adjacent cars for varying the stress in said resilient stabilizer devices and thus regulate the magnitude of the lateral body displacement whereby the angularity of said axle structure may be regulated so as to always direct said wheels substantially tangentially to the rails.

6. In a railway car having wheels and a body mounted resiliently on said wheels, means responsive to lateral displacement of the body when rounding curves for varying the direction of the wheels with respect to the body, resilient means for limiting the magnitude of the lateral body displacement and additional automatic means for varying the resiliency of said resilient means in accordance with the radius of track curvature whereby the wheels may constantly be directed substantially tangentially to the rails.

7. In a railway train comprising a plurality of coupled cars each having a body, a normally transverse axle structure, track wheels mounted on said axle structure, a pair of resilient strut means supporting said body on the ends of said axle structure, a pivotal connection between each of said strut means and said axle structure, radius rods pivotally secured at one end to each end portion of said axle structure and at the other end to the lower part of the body, said radius rods converging inwardly from said axle to form with their pivotal axes a trapezoidal figure whereby upon lateral displacement of the car body said axle structure is rotated from its transverse position, fluid pressure generating means responsive to changes in the angularity between the longitudinal axes of said coupled cars, and adjustable rotation resistant stabilizer devices including pre-stressed resilient means having a central shaft constituting the pivotal connection between said struts and said axle structure and actuable by said fluid pressure generating means for limiting the inclination between said struts and said axle structure to regulate the magnitude of the lateral body displacement whereby the angularity of said axle structure may be regulated to constantly direct the vertical planes of said wheels substantially tangentially to the rails.

8. In a railway car having a body, a normally transverse axle structure, track wheels on said axle structure, a pair of resilient strut means supporting said body on the end portions of said axle structure, a pivotal connection between each of said strut means and said axle structure, a pair of substantially horizontal radius rods pivotally secured at one end to each end portion of said axle structure and at the other end to the lower part of the body, said radius rods converging inwardly from said axle to form with their pivotal axes a trapezoidal figure whereby upon lateral displacement of the car body said axle structure is rotated from its transverse position, stabilizer devices including pre-stressed resilient means associated with said pivotal connection between said axle structure and said strut means for limiting the inclination of said strut means with respect to said axle structure and consequently lateral displacement of said body relative to the axle structure, and means operable to vary the stress in said resilient means and thus to regulate the magnitude of the lateral body displacement whereby the angularity of said axle structure may be regulated so as to always direct the vertical planes of each said wheel substantially tangentially to the rails.

9. In a railway car having a body, a normally transverse axle structure, track wheels on the axle structure, resilient support means pivotally secured to said body and to opposite ends of said axle structure, a pair of substantially horizontal radius rods pivotally secured at one end to each end portion of said axle structure and at the other end to the lower part of the body, said radius rods forming with their pivotal axes and with said axle structure a trapezoidal figure whereby upon lateral displacement of the car body said axle structure is rotated from its transverse position, resilient means for regulating the magnitude of the lateral body displacement, and additional automatic means for varying the resiliency of said resilient means in accordance with the radius of track curvature whereby the angularity of said axle structure and wheels may be regulated so as to constantly direct said wheels substantially tangentially to the rails.

References Cited in the file of this patent

UNITED STATES PATENTS

| | | |
|---|---|---|
| 27,217 | Grice et al. | Feb. 21, 1860 |
| 1,388,508 | Brilhart | Aug. 23, 1921 |
| 1,880,953 | Fageol | Oct. 4, 1932 |
| 1,954,705 | Kruckenberg | Apr. 10, 1934 |
| 2,030,010 | Liechty | Feb. 4, 1936 |
| 2,098,949 | Geissen | Nov. 16, 1937 |
| 2,217,034 | Van Dorn | Oct. 8, 1940 |
| 2,462,666 | Omar | Feb. 22, 1949 |
| 2,604,857 | MacVeigh | July 29, 1952 |

FOREIGN PATENTS

| | | |
|---|---|---|
| 652,474 | Germany | Nov. 1, 1937 |